United States Patent [19]

Ackley et al.

[11] Patent Number: 5,125,054
[45] Date of Patent: Jun. 23, 1992

[54] LAMINATED POLYMER OPTICAL WAVEGUIDE INTERFACE AND METHOD OF MAKING SAME

[75] Inventors: Donald E. Ackley, Paradise Valley; Christopher K. Y. Chun, Mesa; Michael S. Lebby, Chandler, all of Ariz.

[73] Assignee: Motorola, Inc., Schaumburg, Ill.

[21] Appl. No.: 736,969

[22] Filed: Jul. 25, 1991

[51] Int. Cl.$^5$ .................................. G02B 6/30
[52] U.S. Cl. ...................... 385/49; 385/14; 385/130; 385/139
[58] Field of Search ............... 350/96.11, 96.12, 96.15, 350/96.16, 96.17, 96.20, 96.21; 250/227.11; 385/14, 38, 49, 47, 129, 130, 131, 139; 333/116, 118, 128, 137

[56] References Cited

U.S. PATENT DOCUMENTS

| | | | |
|---|---|---|---|
| 4,695,120 | 9/1987 | Holder | 385/14 |
| 4,699,449 | 10/1987 | Lam et al. | 385/49 |
| 4,714,311 | 12/1987 | Auracher | 385/14 |
| 4,732,446 | 3/1988 | Gipson et al. | 350/96.15 |
| 4,747,649 | 5/1988 | Heinen et al. | 350/96.12 |
| 4,756,590 | 7/1988 | Forrest et al. | 350/96.15 |
| 4,772,787 | 9/1988 | Trommer | 250/227.11 |
| 4,883,743 | 11/1989 | Booth et al. | 430/321 |
| 4,904,036 | 2/1990 | Blonder | 385/49 |
| 4,916,497 | 4/1990 | Gaul et al. | 350/96.17 |
| 4,926,545 | 5/1990 | Pimpinella et al. | 385/49 |
| 4,966,430 | 10/1990 | Weidel | 385/14 |
| 4,969,712 | 11/1990 | Westwood et al. | 350/96.11 |
| 5,054,870 | 10/1991 | Lösch et al. | 385/14 |
| 5,061,027 | 10/1991 | Richard | 385/14 |
| 5,073,000 | 12/1991 | Derfiny | 385/49 |

OTHER PUBLICATIONS

"Low Loss Channel Waveguides in Polymers", B. Booth, Oct. 10, 1989, see at least p. 1447, col. 1, line 11 to p. 1448, col. 2, line 11.

"Optical Interconnections of VLSI Systems", J. Goodman et al, Jul. 1984, see at least p. 856, col. 2, lines 19 to 32.

*Primary Examiner*—Brian Healy
*Attorney, Agent, or Firm*—Joe E. Barbee

[57] ABSTRACT

An interface between a laminated polymer optical waveguide (15) and an electronic device (39). The interface does not degrade the desirable properties of the optical waveguide (15), is simple, is low cost, and is compatible with integrated circuit technology as well as optical and electrical connectors (41,42,43,46). The interface includes at least one vertical cavity surface emitting laser or photosensitive diode (11,37) mounted above the surface of the optical waveguide (15). A mirror (21) positioned at an angle with respect to the optical waveguide (15) serves to reflect light between either the vertical cavity surface emitting laser or photosensitive diode (11,37) and the optical waveguide (15). At least one microstrip line (16) couples electrical signals between the vertical cavity surface emitting laser (11,37) and the electronic device (39).

18 Claims, 1 Drawing Sheet

LAMINATED POLYMER OPTICAL WAVEGUIDE INTERFACE AND METHOD OF MAKING SAME

BACKGROUND OF THE INVENTION

The present invention relates, in general, to optical coupling of integrated circuits, and more particularly to the transfer of data between electronic devices by means of modulated light beams directed into planar optical waveguides.

As the speed and density of electronic devices increases the delay due to circuit interconnection has become more significant. In the past, interconnections have used multiple conductor cables, often etched on flexible printed circuit board material to reduce the conductor size and spacing to a minimum. This size reduction is limited by the tendency for signals to interact with one another along the length of the cable, called crosstalk. Crosstalk is aggravated by the reduced conductor cross section, reduced conductor spacing and by increased signal speeds. As a result the use of optical interconnect technology has been explored. Several optical interconnect approaches were advanced by Goodman, et al., "Optical Interconnections for VLSI Systems", Proceedings of the IEEE, vol 72, No. 7, July 1984. An example of such an optical interface between integrated circuits is co-pending application by F. V. Richard, Tempe, Ariz., assigned to the same assignee: U.S. application Ser. No. 07/576,914, filed Sep. 4, 1990, now U.S. Pat. No. 5,061,027, entitled "Solder-Bump Attached Optical Interconnect Structure". Further advances in the art have included the use of laminated polymer optical waveguides as the optical medium. This has been described by B. L. Booth, "Low Loss Channel Waveguides in Polymers", IEEE Journal of Lightwave Technology, Vol. 7, No. 10, October 1989. An example of such a laminated polymer optical waveguide used in an optical connector is described in U.S. Pat. No. 4,883,743, "Optical Fiber Connector Assemblies and Methods of Making the Assemblies", issued on Nov. 28, 1989, to B. L. Booth et al, assigned to E. I. Du Pont De Nemours & Co.,Inc., and is incorporated herein by reference. The assignee markets a laminated polymer optical waveguide under the trademark "Polyguide". Laminated polymer optical waveguide such as Polyguide combines the high bandwidth, low crosstalk capability of optical cables with the high density multiple signal capability of electrical cable. In addition this laminated polymer optical waveguide can form simple optical connectors functionally similar to electrical connectors well known in the art.

An optical signal path alone is not useful. To be useful as a path for electrical signals, the optical signals must be interfaced to electrical circuits. Such an interface must meet many requirements. The interface must maintain the high bandwidth, low crosstalk, and high density of the optical cable. The interface must not compromise the capability of the optical cable to form a ribbon comprising a plurality of optical waveguides spaced as densely as 65 parallel waveguides per cm. In addition, the interface must be low cost, must be simple to assemble and to package, and must be compatible both physically and electrically to electronic devices. A simple electrical and optical connector scheme is required. An interface which uses a vertically emitting or sensing optical device such as a vertical cavity surface emitting laser or vertically photosensitive diode rather than a horizontally operating optical device is desirable. Use of a vertically operating optical device aids alignment of the device with the optical waveguide. Typically the outside dimensions of optical devices is not well controlled so some form of adjustment in the vertical plane is required if a horizontally operating optical device is used. In addition such a horizontally operating optical device must be mounted at precisely the same angle as the axis of the optical waveguide, further complicating the assembly process. Finally, it is estimated that a vertical cavity surface emitting laser can be fabricated in high volume for approximately $.25 per device, compared with $1 to $2 for a horizontally functioning equivalent. There is a need for an interface between laminated polymer optical waveguide and electronic devices which meet all of these requirements and uses vertically operating optical devices.

SUMMARY OF THE INVENTION

Briefly stated, the present invention provides an interface between a laminated polymer optical waveguide and an electronic device. The interface does not degrade the desirable properties of the laminated polymer optical waveguide, is simple, is low cost, and is compatible with integrated circuit technology as well as optical and electrical connectors. The interface can be constructed with parallel channels as dense as 65 channels per cm. The interface includes at least one vertical cavity surface emitting laser or photosensitive diode mounted above the surface of the laminated polymer optical waveguide. A mirror positioned at an angle with respect to the laminated polymer optical waveguide reflects light between either the vertical cavity surface emitting laser or the photosensitive diode and the waveguide. At least one laminated microstrip line couples electrical signals between the vertical cavity surface emitting laser and components of the electrical circuit.

DETAILED DESCRIPTION OF THE DRAWINGS

Figure 1:
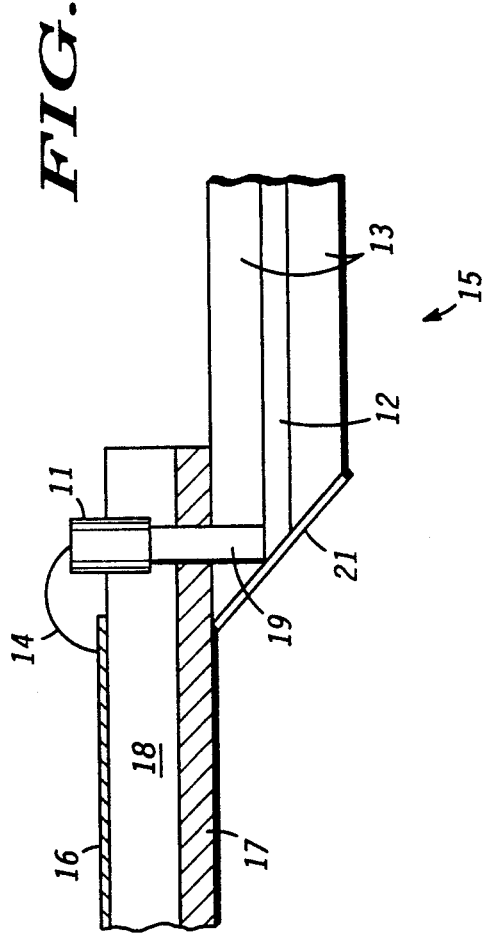
FIG. 1 shows a cross sectional view of a laminated polymer optical waveguide interface as a preferred embodiment of the present invention.

FIG. 1 shows a cross sectional view of a laminated polymer optical waveguide interface as a preferred embodiment of the present invention. At least one vertically operating optoelectronic interface means 11 is mounted in a substrate 18. Vertically operating optoelectronic interface means 11 comprises at least one vertically operating optoelectronic device which may be either an optoelectronic transmitter such as a vertical cavity surface emitting laser, or an optoelectronic receiver such as a photosensitive diode. Embodiments which utilize a plurality of vertically operating optoelectronic interface means 11 utilize a combination of optoelectronic transmitters and optoelectronic receivers. An alternative embodiment of the present invention uses a light emitting diode for the optoelectronic transmitter part of optical interface means 11.

Substrate 18 comprises a layer of insulating material such as a ceramic or other material commonly used to fabricate microwave printed circuits. A ground plane layer 17 is mounted beneath substrate 18. Ground plane layer 17 is electrically coupled to vertically operating optoelectronic interface means 11, serving as an electrical ground return circuit. At least one microstrip line 16 is mounted on the top surface of substrate 18 and serves to couple at least one electrical signal between the at least one vertically operating optoelectronic interface means 11 and at least one electronic device (not shown). Laminated polymer optical waveguide 15 couples at least one optical signal along its length. Laminated polymer optical waveguide 15 comprises at least one optical waveguide 12 and a plurality of laminated cladding layers 13. Optical waveguide 12 with a high refractive index in turn comprises a layer of polymer material through which at least one optical channel has been fabricated so as to form at least one optical waveguide 15 having lower refractive indexed material to either side. Cladding layers 13 comprise lower refractive indexed material which is laminated at least above and below optical waveguide 12. Alternative embodiments of the present invention utilize a laminated polymer optical waveguide 15 having only a single cladding layer 13.

Only a single data channel comprising a plurality of optical waveguides 12, vertically operating optoelectronic interface means 11, and microstrip lines 16 can be seen in FIG. 1. A typical embodiment of this invention, however, includes a plurality of closely spaced parallel data channels in a planar form. The plane of the data channels extends into and out of the sheet since FIG. 1 is a cross sectioned view. The construction of laminated polymer optical waveguide 15 allows for photolithographic definition of parallel optical waveguides 12 and lower refractive index of the laminate (not shown) serving to separate adjacent pairs of optical waveguides 12. The parallel data channels are constructed with densities as high as as 65 channels per cm.

At least one reflective surface or mirror 21 is positioned at an angle with respect to laminated polymer optical waveguide 15. A hole 19 is provided through substrate 18, ground plane layer 17, and laminated cladding 13 so as to couple light between vertically operating optoelectronic interface means 11 and optical waveguide 12. Mirror 21 serves to reflect light between vertically operating optoelectronic interface means 11 and optical waveguide 12. Vertically operating optoelectronic interface means 11 is mounted above mirror 21. Mirror 21 is typically fabricated by laser ablation, coated with any suitable reflective material such as evaporated aluminum or the like. Other fabrication techniques might include stamping, etching, or the like. Mirror 21 is typically fabricated at an angle of 45 degrees with respect to optical waveguide 12. Alternative embodiments of the present invention mount mirror 21 at different angles to allow variations in mounting of vertically operating optoelectronic interface means 11, as well as optimizing the coupling between waveguide 12 and optoelectronic interface means 11. Another embodiment fabricates mirror 21 in a curved shape to achieve a desired focusing effect or to widen the light beam and increase the tolerance for misalignment between components of the interface.

Figure 2:
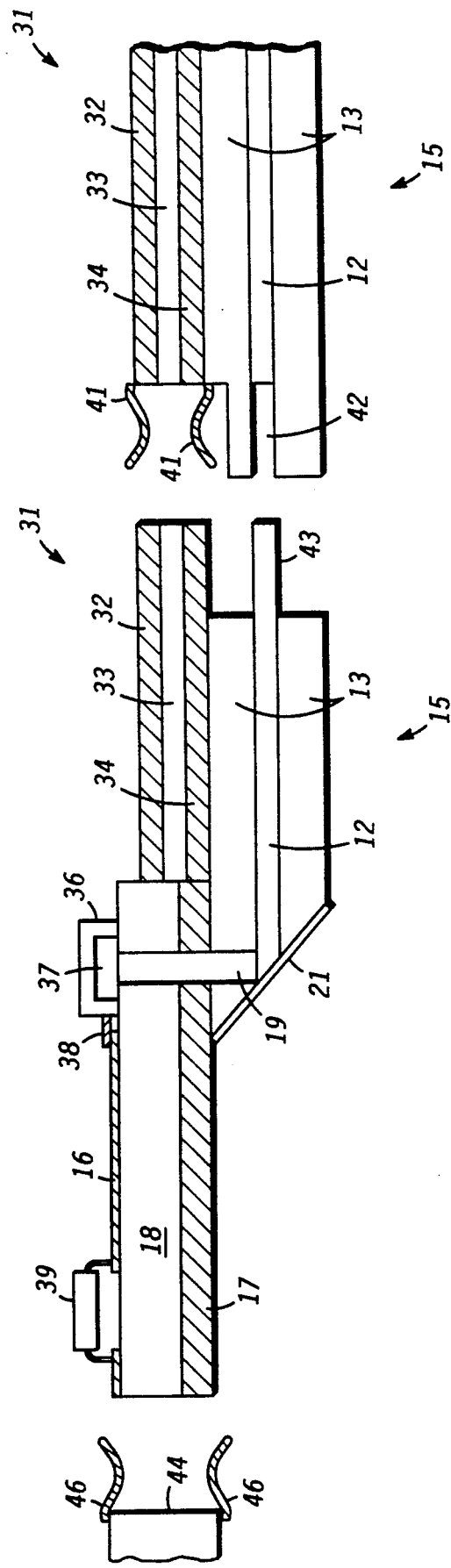
FIG. 2 shows a cross sectional view of a laminated polymer optical waveguide interface as an alternative embodiment of the present invention.

FIG. 2 shows a cross sectional view of a laminated polymer optical waveguide interface as an alternative embodiment of the present invention. In a fashion similar to the laminated polymer optical waveguide interface illustrated in FIG. 1, this embodiment of the invention also is typically fabricated as a plurality of closely spaced data channels which extend through the plane of the illustration. This embodiment mounts at least one electronic device 39, such as a surface mounted integrated circuit or a die attached chip, on substrate 18. Other embodiments mount a plurality of integrated circuits such as drivers, multiplexors, de-multiplexors, buffers, and amplifiers in a similar way. Microstrip line 16 serves to couple at least one electrical signal between at least one optoelectronic interface means 37 and electronic device 39. For illustration a typical device lead 38 is also shown. Optoelectronic interface means 37 comprises part of at least one optoelectronic integrated circuit 36 but is functionally similar to vertically operating optoelectronic interface means 11 (FIG. 1). Likewise, optoelectronic interface means 37 is fabricated as a vertically operating optoelectronic device. Optoelectronic integrated circuit 36 comprises a plurality of optical receivers and optical transmitters fabricated using a common semiconducting substrate.

Laminated together with laminated polymer optical waveguide 15 in this embodiment is a microstrip line 31. Microstrip line 31 comprises a conductive layer 34, a flexible insulating layer 33 and at least one additional conductive layer 32. Conductive layer 34 forms a ground plane for microstrip line 31. Microstrip line 31 serves to couple high bandwidth electrical signals along the length of laminated polymer optical waveguide 15 in addition to the optical signals. Some embodiments utilize a conductive layer similar to conductive layer 34 alone, without fabricating a microstrip line, for distribution of electrical power or low frequency electrical signals. Alternative embodiments include the flexible printed circuit structures which are well known in the art laminated together with laminated polymer optical waveguide 15 in this way. These embodiments allow a plurality of electrical signals, optical signals, and power buses to be be combined within a single electro-optical cable. An alternative embodiment laminates conductive layer 34 to both sides of waveguide 12 and cladding layers 13. This embodiment allows for construction of multi-layer conductive media.

In this embodiment of the present invention a variety of connector means is coupled to the optical waveguide interface. At least one electrical connector comprising a plurality of contact fingers 46 is employed to electrically couple microstrip line 16 to at least one electronic device (not shown) mounted on a printed circuit board 44. A separate section of laminated polymer optical waveguide 15 is optically coupled to the laminated polymer optical waveguide interface by a connector comprising optical probe 43 and recess 42. Optical probe 43 and recess 42 are fabricated during lamination or by machining after lamination. A plurality of contact fingers 41 serves to electrically couple the two sections of microstrip line 31. The connector means described herein are representative of many types known to those skilled in the art and are used to show how the laminated polymer optical waveguide interface is compatible with these connectors.

By now it should be apparent that the present invention provides an interface between optical cables and electrical circuits. The interface maintains the high bandwidth, low crosstalk, and high density of optical cable. In addition, the interface is low cost, is simple to assemble and to package, and is compatible both physically and electrically to electronic devices. In addition simple electrical and optical connector schemes are compatible with the interface.

We claim:

1. A laminated polymer optical waveguide interface, comprising:
   at least one laminated polymer optical waveguide which couples at least one optical signal along its length;
   at least one vertically operating optoelectronic interface means which serves as at least one optical transmitter and as at least one optical receiver;
   at least one mirror positioned at an angle with respect to the laminated polymer optical waveguide and serves to reflect light between the vertically operating optoelectronic interface means and the optical waveguide; and
   at least one laminated microstrip line which serves to couple at least one electrical signal between the vertically operating optoelectronic interface means and at least one electronic device.

2. The laminated polymer optical waveguide interface of claim 1 wherein the vertically operating optoelectronic interface means comprises at least one surface mounted vertical cavity surface emitting laser.

3. The laminated polymer optical waveguide interface of claim 1 wherein the vertically operating optoelectronic interface means comprises at least one surface mounted light emitting diode.

4. The laminated polymer optical waveguide interface of claim 1 wherein the vertically operating optoelectronic interface means comprises at least one surface mounted photosensitive diode.

5. The laminated polymer optical waveguide interface of claim 1 wherein the vertically operating optoelectronic interface means comprises at least one optoelectronic integrated circuit which itself comprises a plurality of optical interface means fabricated on a common semiconducting substrate.

6. The laminated polymer optical waveguide interface of claim 1 further comprising:
   at least one connector fabricated by machining of the laminated polymer optical waveguide which is coupled to the laminated polymer optical waveguide interface.

7. The laminated polymer optical waveguide interface of claim 1 further comprising:
   a plurality of closely spaced parallel data channels in a planar form formed by photolithographic definition.

8. The laminated polymer optical waveguide interface of claim 1 further comprising:
   at least one conductive layer laminated together with the laminated polymer optical waveguide and which serves to couple at least one electrical signal along the length of the laminated polymer optical waveguide in addition to the at least one optical signal.

9. The laminated polymer optical waveguide interface of claim 1 further comprising:
   at least two conductive layers laminated as part of the laminated polymer optical waveguide to form at least one microstrip line and which serves to couple at least one high bandwidth electrical signal along the length of the laminated polymer optical waveguide in addition to the at least one optical signal.

10. A method for interfacing between optical signals and electrical signals, comprising:
    coupling at least one optical signal along the length of at least one laminated polymer optical waveguide;
    forming a reflective surface by laser ablation of the laminated polymer optical waveguide followed by coating with a reflective material;
    mounting at least one vertically operating optoelectronic device above the reflective surface;
    reflecting the optical signal from the laminated polymer optical waveguide to the vertically operating optoelectronic device; and
    coupling at least one electrical signal from the vertically operating optoelectronic device to at least one integrated circuit.

11. The method for interfacing between optical signals and electrical signals of claim 10 wherein mounting the vertically operating optoelectronic device comprises mounting at least one surface mounted vertical cavity surface emitting laser.

12. The method for interfacing between optical signals and electrical signals of claim 10 wherein mounting the vertically operating optoelectronic device comprises mounting at least one surface mounted photosensitive diode.

13. The method for interfacing between optical signals and electrical signals of claim 10 further comprising:
    coupling at least one connector means to the laminated polymer optical waveguide interface.

14. The method for interfacing between optical signals and electrical signals of claim 10 further comprising:
    coupling at least one electrical signal between the vertically operating optoelectronic interface means and at least one electronic device with at least one laminated microstrip line.

15. The method for interfacing between optical signals and electrical signals of claim 10 further comprising:
    coupling at least one electrical signal along the length of the laminated polymer optical waveguide in addition to the at least one optical signal by means of at least one conductive layer laminated together with the laminated polymer optical waveguide.

16. The method for interfacing between optical signals and electrical signals of claim 10 further comprising:
    coupling at least one high bandwidth electrical signal along the length of the laminated polymer optical waveguide in addition to the at least one optical signal by means of a microstrip line laminated together with the laminated polymer optical waveguide.

17. A laminated polymer optical waveguide interface, comprising:
    at least one laminated polymer optical waveguide, formed by photolithographic definition within a plurality of parallel optical waveguides which serves to couple at least one optical signal along its length;
    at least one vertically operating optoelectronic device which serves as an optical transmitter;
    at least one reflective surface formed by laser ablation of the laminated polymer optical waveguide followed by coating with a reflective material which is positioned at an angle with respect to the laminated polymer optical waveguide serving to reflect light between the vertically operating optoelectronic device and the optical waveguide;
    at least one surface mounted integrated circuit;

at least one laminated microstrip line which serves to couple at least one electrical signal between the vertically operating optoelectronic interface means and the surface mounted integrated circuit; and a microstrip line laminated together with the laminated polymer optical waveguide which serves to couple high bandwidth electrical signals along the length of the laminated polymer optical waveguide in addition to the optical signals.

18. The laminated polymer optical waveguide interface of claim 1, wherein the at least one mirror is formed by laser ablation of the laminated polymer optical waveguide followed by coating with a reflective material.

* * * * *